Nov. 28, 1933.  R. P. LANSING  1,937,234
DRIVING MECHANISM
Filed April 28, 1931
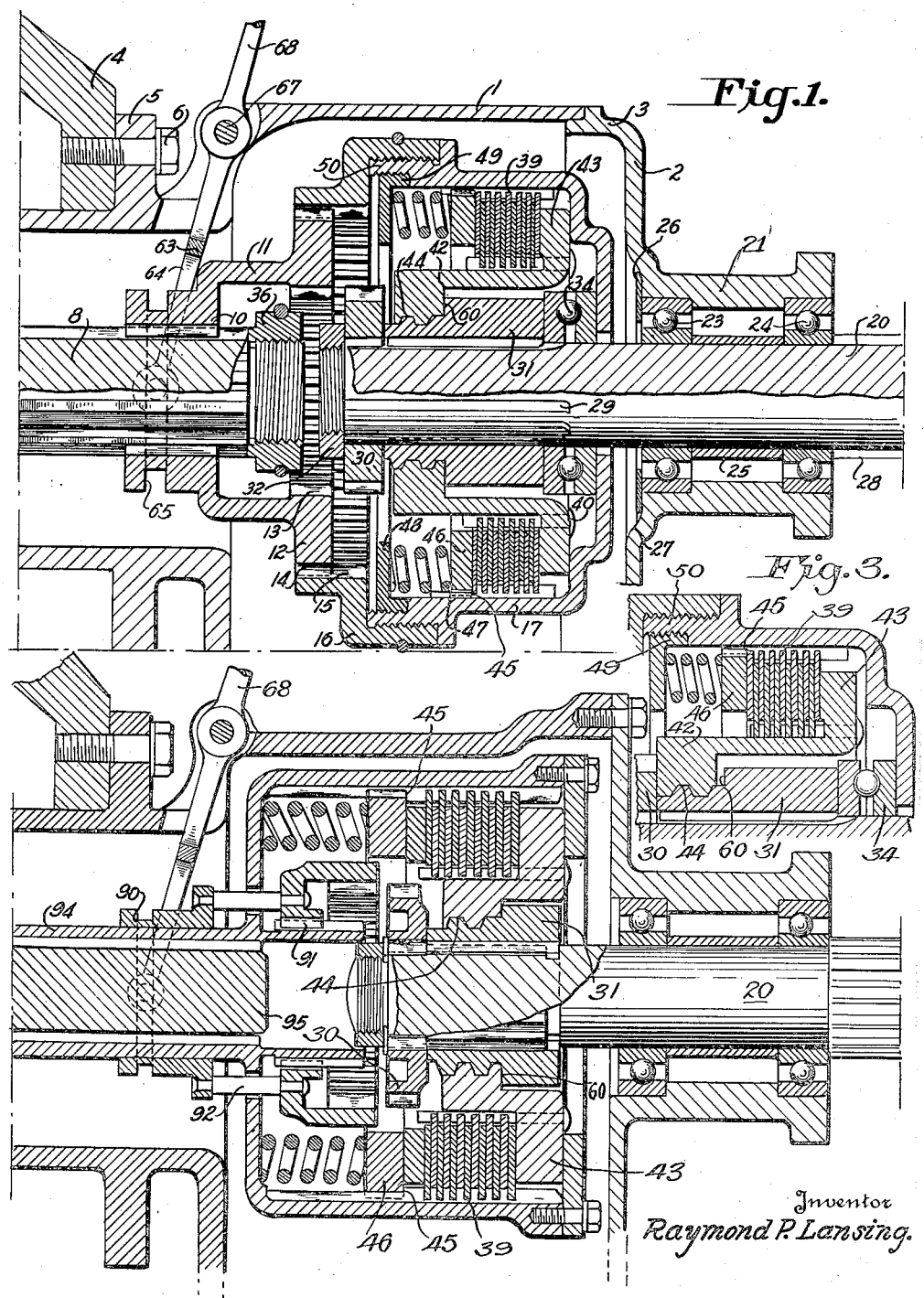
Inventor
Raymond P. Lansing.
By
F. B. Smith
Attorney Patented Nov. 28, 1933

1,937,234

UNITED STATES PATENT OFFICE 1,937,234

DRIVING MECHANISM

Raymond P. Lansing, Montclair, N. J.

Application April 28, 1931. Serial No. 533,565

8 Claims. (Cl. 192—48)

This invention relates to driving mechanisms and particularly to mechanisms of the type in which the driven member under certain circumstances becomes the driving member, and under other conditions runs faster (or overruns) the driving member.

An object of the invention is to provide a mechanism of the foregoing character, which although capable or adaptable to other uses, is particularly well suited for use as a motor vehicle transmission mechanism.

In motor vehicle operation it is desirable to provide means whereby traction members of the vehicle, after obtaining a certain momentum, may be drivably disconnected from the power shaft of the vehicle so that the traction members may continue to rotate at a speed faster than the then existing gear ratio between the power shaft and the traction members alone would permit. In the motor vehicle art, such disconnecting mechanisms are commonly referred to as free-wheeling or free-wheel devices, to which general class the present invention, in so far as it is used in the motor vehicle art, relates.

Another object of the invention is to provide a free-wheel device of the foregoing character involving the use of a friction clutch mechanism of novel construction constituting a driving connection under certain conditions and being automatically releasable to permit free-wheeling under other conditions.

Another object of the invention is to provide in a device embodying friction clutch mechanism of the foregoing character, novel means for controlling the stress applicable upon said friction clutch mechanism to regulate the torque transmitting capacity thereof.

Another object of the invention is to provide novel stress controlling means of the foregoing character which will be governed in its operation by the relative rotative speeds of the driving and driven members.

A further object of the invention is to provide in conjunction with the novel stress controlling means just referred to a manually shiftable device capable of drivably connecting the driving and driven members independently of said friction clutch mechanism.

A further object of the invention is to provide in a free-wheeling device embodying friction clutch mechanism of the character just described, novel means operative upon such mechanism to maintain therein an initial relatively light frictional pressure serving to make it possible to immediately establish driving connection between the engine and traction members when such driving connection is desired, irrespective of the speed of the engine.

A further object of the invention is to provide a device of the foregoing character possessing practical merit because of its simplicity of construction, flexibility of operation, ease of installation and accessibility.

These and other objects and advantages to be derived from the use of the invention herein disclosed will become evident from an inspection of the following description when read with reference to the accompanying drawing:

In the drawing,

Fig. 1 is a central longitudinal section view of the device embodying the invention with the parts shown in the relative positions occupied during the free wheeling action; and Fig. 2 is a similar sectional view of another embodiment of the invention, and Fig. 3 is a central sectional view of certain of the parts shown in Fig. 1, in the positions which they occupy during the condition of normal drive.

Referring to the drawing, the invention is shown embodied in a casing having two sections, 1 and 2, the latter having a flange 3 for the reception and mutual support of the two sections which together constitute a housing attachable at one end to a suitable casing 4 which may be part of the gear shift mechanism or other part of the power plant with which the invention is associated, the section 1 being provided with a flange 5 through which suitable fastening means 6 may be inserted to hold the housing in supported relation to the casing 4.

Entering the housing at the forward end is a driving member 8 which may be the engine connected shaft of a motor vehicle or other device to which the invention is applied. As shown, the shaft 8 is provided with splines adapted to engage corresponding splines on the internal cylindrical surface of the hub 10 of the collar 11 having a flange 12 provided at both its internal and external cylindrical surfaces with teeth or splines 13 and 14, the latter being in mesh with corresponding teeth or splines 15 formed on a flanged cylindrical member 16 which together with the cooperating member 17 constitutes an inner casing containing and supporting the novel clutch mechanism to be described.

In the embodiment now being described, the driven member preferably takes the form of a shaft 20 extending longitudinally through the centrally disposed hub 21 of the section 2 of the casing, being rotatably supported in said hub by suitable ball bearing members 23 and 24 and spaced apart by a suitable spacer 25 and held in place by a retaining ring 26 registering with a recess 27 in the inner wall of section 2. The shaft 20 may be provided with splines 28 or other suitable means for connection to the mechanism leading to the traction members of the vehicle, similar connecting means 29 being provided on the inner end of the shaft for engagement with a correspondingly splined collar 30 and threaded sleeve or screw 31, the purpose of which will appear more fully hereinafter. The outer end of the shaft 20 is preferably threaded for engagement with a nut 32 adapted to maintain members 30 and 31 in place, the resulting thrust being absorbed by a suitable bearing member 34 interposed between the end of the screw 31 and the wall of the section 17 of the inner casing. The driving shaft 8 is likewise provided with a threaded end portion for attachment of a nut 36 whose function is similar to that of the nut 32.

The novel yielding clutch mechanism drivably connecting the shafts 8 and 20 preferably comprises the provision of an assembly of annular discs 39, the individual discs of which assembly are splined alternately to an inner circumferential surface of the member 17 and to the pins 40, which are disposed in angular relation upon the cylindrical surface of a sleeve 42, the latter having an outwardly extending flange 43 against which the discs 39 abut, while the opposite end of the sleeve 42 is provided with an inwardly extending flange 44 having a centrally threaded opening adapted to engage the corresponding thread on screw 31.

The means provided for exerting an axial pressure on the discs 39 to regulate the torque transmitting capacity thereof preferably takes the form of an annular pressure plate 46 disposed adjacent the outermost discs 39 and against which are pressed a plurality of angularly spaced compression springs 47 the opposite ends of which abut annular retaining disc 48 having a flange 49 threaded to a correspondingly threaded rim 50 constituting the end of the member 17, the pressure of the springs 47 upon the discs 39 being pre-set according to the setting of retaining ring 48 with respect to the member 17, this setting being of course adjustable due to the provision of a threaded engagement therebetween.

In one position of the parts indicated in Fig. 1, the adjustment of the retaining disc 48 and the strength of the springs 47, and the frictional qualities of the discs 39 are preferably such that sufficient torque may be transmitted through the discs 39 to constitute a practically non-slipping driving connection—in the absence of unusual shocks or extraordinary sudden loads—between the shafts 8 and 20, the path of torque transmission being by way of the collar 11, members 16 and 17, and discs 39, pins 40, sleeve 42 and screw 31. In the event however, that the vehicle accumulates sufficient momentum, or for any other reason the driven shaft 20 is caused to rotate at a speed faster than that which the shaft 8 imparts thereto through the connections just described, the resultant excess speed of the screw 31 with respect to the sleeve 42 causes a jackscrew action between the cooperating and correspondingly pitched and directed threads of these members, which jack-screw action moves the member 42 from its position of contact with collar 30, as shown in Fig. 3, to the position shown in Fig. 1, in which latter position further movement is prevented by the abutment with the shoulder 60 on the screw 31. Such movement expands the springs 47 sufficiently to move the pressure plate 46 along the splines on the inner surface of the casing until it abuts the shoulders 45 of said splines, thus transferring the thrust of the springs 47 to the casing 17 and relieving the discs 39 of practically all axial pressure with the result that the torque transmitting capacity of said discs drops to a very slight value commensurate with inherent frictional qualities of the surfaces of the discs when no, or practically no pressure is exerted thereon, other than that caused by the axial thrust of the nut 43.

The result of the action just described is that the traction members or other means driven from the shaft 20 are free to run at any speed in excess of the speed of rotation of the shaft 8 and the casing member 17. As soon, however, as the speed of the shaft 20 falls below that of the power shaft 8 or conversely, as soon as the power shaft 8 is accelerated to a speed beyond that of the traction shaft 20, the reverse jackscrew action resulting therefrom will cause a return of the member 42 to the position shown in Fig. 3 and a resultant restressing of the springs 47 to re-establish a condition of maximum torque transmission between the driving and driven members. Under this condition, the clutch 39 has sufficient torque capacity to take care of the maximum torque requirements of the prime mover; yet this torque capacity as above suggested is held by the setting of the retaining disc 48 to protect the parts against jamming action such as might result were a non-slidable driving connection resorted to.

If it be desired to temporarily lock the mechanism against over-running or free-wheeling, such a result may be effected by shifting the collar 11 to the right of the position shown in Fig. 1 sufficiently to cause the teeth or splines 13 to register with the corresponding teeth on the collar 30 whereupon a positive driving connection independent of the clutch mechanism is established, the drive being directly from the collar 11 to the shaft 20 through the instrumentality of a single intermediate member 30.

Any suitable means may be employed for producing such an axial shift of the collar 11. As illustrated such means takes the form of a shifter fork 63 having a semi-circular yoke 64 engageable with the circumferential groove 65 on the hub of collar 11, the shifter being suitably pivoted to the casing 1, as indicated at 67, and having an upwardly extending arm 68 which is manually operable.

When the novel mechanism herein disclosed is applied to, or made a part of, a motor vehicle power plant, it may be installed in any desired location relative to the engine, as for example, adjacent the transmission or gear shift casing. It is to be understood, however, (as above suggested) that the invention is applicable to other uses wherein it is desirable to drivably connect driving and driven members in such manner as to permit either to act as the driver, or under other conditions to permit the members to rotate independently.

While the embodiment of the invention herein disclosed and described in detail is of considerable practical merit, it is contemplated that changes may be made in the construction and relative arrangement of the parts. Thus, for example, the relative location of the parts may be varied, and the shaft 20 may be made the driving member with the shaft 8 the driven member. Likewise, the construction of the free-wheeling mechanism may be varied, one such variation being indicated in Fig. 2 wherein in place of the collar 11 of Fig. 1 there is provided a pair of collars 90 and 91 connected for unitary rotation by suitable angularly spaced pins 92 by which construction the inner casing is driven through a direct splined connection between the elongated extension 94 of the casing and the driving shaft 95.

It is to be understood that various other changes may be made in the form, details of construction, arrangement of parts and the uses to which they are applied, without departing from the spirit of the invention or the scope of the appended claims.

What is claimed is:

1. Power transmission mechanism comprising a driving member, a driven member, a clutch drivably connecting the members but permitting independent rotation thereof in one relative direction, means including a collar held fast on said driven member for limiting maximum clutch pressure, and means directly engageable with said collar to form a positive connection between said driving and driven members independently of said clutch.

2. In a device of the class described, a driving member, a driven member, a friction clutch mechanism drivably connecting said members, means including a plurality of resilient members and a rotatable axially movable member engageable with said clutch mechanism for decreasing the torque capacity of said clutch mechanism whenever the driven member overruns the driving member, and separate manually controlled means for rendering said torque capacity-decreasing means ineffective.

3. In a device of the class described, a driving member, a driven member, a friction clutch mechanism drivably connecting said members, means including a plurality of resilient members and a rotatable axially movable member engageable with said clutch mechanism for decreasing the torque capacity of said clutch mechanism whenever the driven member overruns the driving member, a collar held fast on said driven member, and means directly engageable with said collar to form a positive connection between said driving and driven members independently of said clutch mechanism.

4. In a device of the class described, a driving member, a driven member, a friction clutch mechanism drivably connecting said members, means including a plurality of resilient members and a rotatable axially movable member engageable with said clutch mechanism for decreasing the torque capacity of said clutch mechanism whenever the driven member overruns the driving member, and means adjustably positioned on said driving member to regulate the pressure of said resilient members on said clutch mechanism.

5. In a device of the class described, a driving member, a driven member, a friction clutch mechanism drivably connecting said members, means including a plurality of resilient members and a rotatable axially movable member engageable with said clutch mechanism and operative to decrease the torque capacity of said clutch mechanism whenever the driven member overruns the driving member, and means adjustably positioned on said driving member to maintain in the elements of said clutch mechanism an initial relatively light frictional pressure irrespective of either the absolute or relative speeds of said parts.

6. In a device of the class described, a driving member, a drum operatively connected therewith, a driven shaft extending within said drum, a friction clutch drivably connecting said drum and driven shaft, means including a resilient member and a rotatable axially movable member engageable with said clutch and operative to decrease the torque capacity of said clutch whenever the driven shaft overruns the drum, a splined member on said driven shaft, and means engageable with said splined member to form a positive connection between said driving member and said shaft independently of said friction clutch.

7. In a device of the class described, a driving member, a drum operatively connected therewith, a driven shaft extending within said drum, a friction clutch drivably connecting said drum and driven shaft, means including a rotatable axially movable member engageable with said clutch and operative to decrease the torque capacity of said clutch whenever the driven shaft overruns the drum, a splined member on said driven shaft, and means engageable with said splined member to form a positive connection between said driving member and said shaft independently of said friction clutch, said last named means also constituting the connection between said driving member and drum.

8. In a device of the class described, a driving member, a driven member, a friction clutch mechanism drivably connecting said members, means including a rotatable axially movable member engageable with said clutch mechanism and operative to decrease the torque capacity of said clutch mechanism whenever the driven member overruns the driving member, a collar held fast on said driven member, and means directly engageable with said collar to form a positive connection between said driving and driven members independently of said clutch mechanism, said collar also acting to limit axial movement of said clutch engaging member.

RAYMOND P. LANSING.